United States Patent [19]
Brasa

[11] 3,938,646
[45] Feb. 17, 1976

[54] METHOD AND APPARATUS FOR DEVIATING OBJECTS TRANSPORTED ALONG A CONVEYOR

[76] Inventor: Umberto Brasa, Uguccione da Pisa, N° 6, Milan, Italy

[22] Filed: Jan. 14, 1974

[21] Appl. No.: 432,861

[52] U.S. Cl. .............................................. 198/31 R
[51] Int. Cl.² ........................................ B65G 47/26
[58] Field of Search ......... 198/31 AB, 31 R, 30, 29, 198/34, 31 AC, 188, 102; 271/184, 225, 64; 101/118, 117, 129; 34/236

[56] References Cited
UNITED STATES PATENTS

| | | | |
|---|---|---|---|
| 680,214 | 8/1901 | Baker | 198/188 |
| 2,094,879 | 10/1937 | Erb | 271/225 UX |
| 3,072,095 | 1/1963 | Keessen et al. | 198/34 X |
| 3,224,549 | 12/1965 | Cella et al. | 198/30 |
| 3,473,800 | 10/1969 | Nystrand | 271/184 X |

*Primary Examiner*—Robert J. Spar
*Assistant Examiner*—James M. Slattery
*Attorney, Agent, or Firm*—Silverman & Cass, Ltd.

[57] ABSTRACT

The conveyor is formed of a plurality of endless belts arranged with their upper reaches parallel in horizontally spaced rows and include a pair of downwardly directed loops. The diverting or deviating apparatus comprises a second set of endless belts, at least one being movable in each loop in a direction transverse to the conveyor, the second set being mounted to be raised and lowered selectively to dispose their upper reaches above or below the plane of the conveyor. A suction generating device is arranged to apply suction to objects so as to cause them to be engaged by the transversely directed belts at selected times. Fingers are provided on the downstream side of the loop pair and are arranged selectively to intercept and stop the object traveling along the conveyor. When the object is stopped, the second set of belts is raised above the plane of the upper reach of the conveyor and suction applied. The transversely directed belts engage the object and direct it transversely of its original path. When the diverted object reaches a preselected location, it is stopped and held in place. The next object reaching the fingers is stopped and held in place. The transversely directed belts are lowered and the suction removed. The next object reaching the fingers triggers a switch which causes the fingers to be lowered out of their intercepting condition. Accordingly both objects now proceed side by side to a pair of side by side locations downstream of the fingers.

7 Claims, 6 Drawing Figures

METHOD AND APPARATUS FOR DEVIATING OBJECTS TRANSPORTED ALONG A CONVEYOR

BACKGROUND OF THE INVENTION

FIELD OF THE INVENTION

This invention relates generally to the transportation of objects upon a conveyor, and more particularly provides a method and apparatus for diverting or deviating such objects from an original path to paths in different directions for distributing such objects to different locations.

The problems to which the invention is directed originate in the silk screen printing art where the output of a single printing maching is directed to a pair of laterally arranged dryers. In view of the velocity of production of the printed sheets from the printing machine, a single drier would have to have a course in the longitudinal direction of almost interminable length. One solution to this problem would be to station a person at the outlet of the printing machine manually to divert the emerging sheets to one and to another of a pair of dryers. This results in the interruption of the automatic sequences of the printing processes and, of course, increased costs. Accordingly, the automation of the distribution of said sheets would be desirable.

SUMMARY OF THE INVENTION

Method and apparatus for distributing objects traveling upon continuously operating conveyor means so that each individual successive object is stopped at a predetermined position of the conveyor and its further advance takes place in a direction transverse of its prior path.

The objects travel successively on the upper reach of the conveyor means. The conveyor means includes a pair of spaced downwardly directed loops and second conveyor means is arranged for travel within each of said loops and in a direction transverse to the direction of the first conveyor means. Stop means, in the form of fingers, are arranged to intercept the path of travel along said first conveyor means downstream of and adjacent to said loops. When such interception takes place, the second conveyor means is raised and the object is caused to be engaged thereby, thereby changing the direction of travel thereof to one transverse its original direction. Stop means are provided at a predetermined location along said transverse path so that the object is carried only a predetermined distance in the transverse direction. The next successive object traveling along the first conveyor means reaches the fingers and is sensed, with the fingers being lowered from their intercepting condition. The objects then proceed side by side to the inlets of side by side located driers.

DESCRIPTION OF PREFERRED EMBODIMENT

Figure 1:
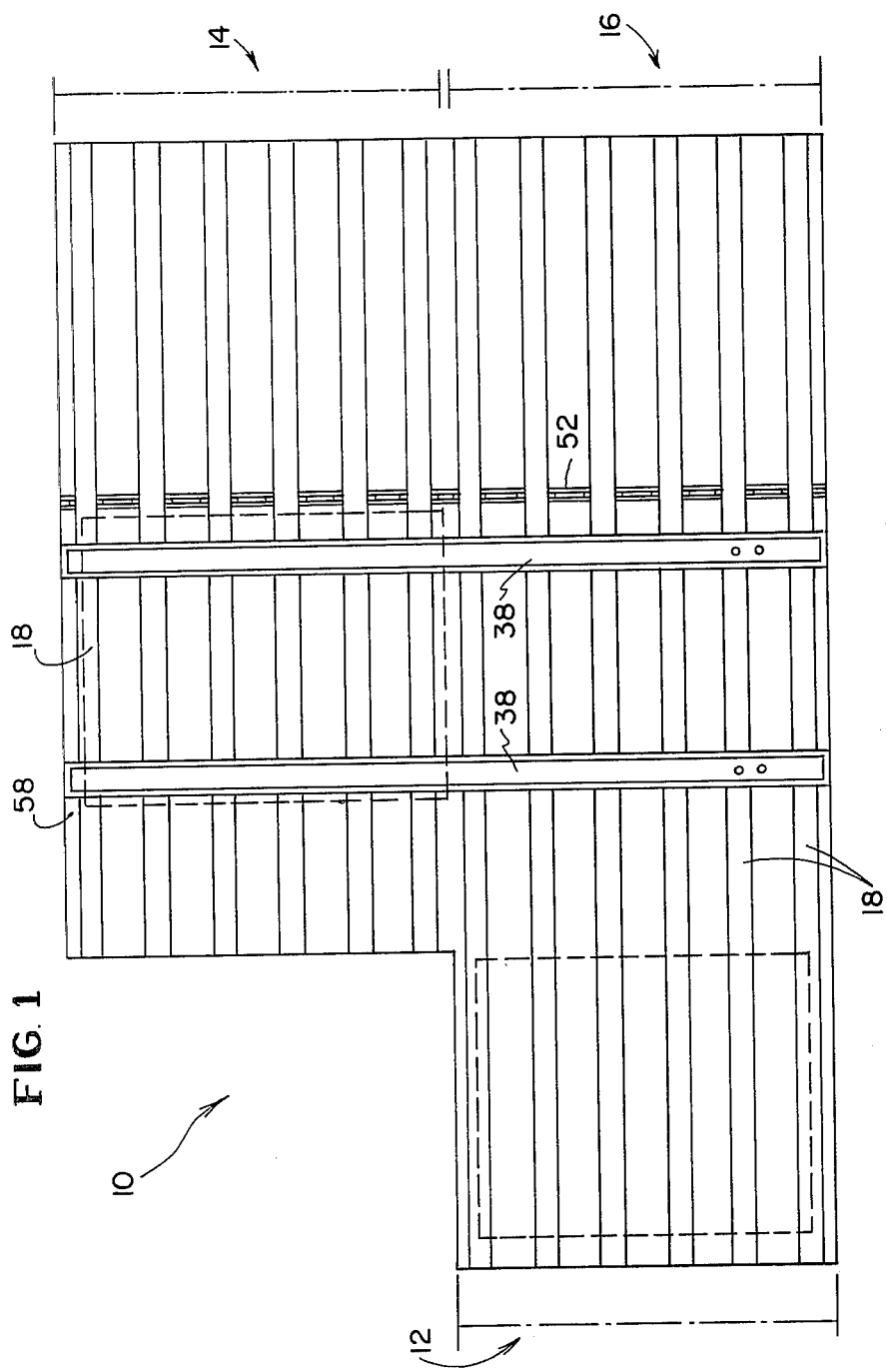
FIG. 1 is a plan view of a conveyor system adapted to receive printed sheets from a single printing machine and transporting said sheets to a pair of laterally disposed driers, and illustrating the diverting means of the invention.

The invention provides a solution to the problem of feeding objects traveling along a conveyor alternatively to a pair of side by side locations downstream of the conveyor. In the particular embodiment described herein, the material conveyed comprises printed sheets emerging from a printing machine and fed to a first conveyor. At the downstream end of the first conveyor, two side by side driers are located having their inlets arranged to be fed with said sheets. According to the invention, the sheets travel successively along the upper reach of the first conveyor, are stopped at a predetermined location and alternatively, one is directed along a path transverse to its path along the conveyor and the next sheet is stopped at that predetermined location. Thereafter, both sheets are released to travel side by side to the respective inlets of said driers.

The first conveyor comprises plural endless belts arranged between the outlet of the printing machine and the inlets of the driers. The belts are arranged so that their upper reaches are coplanar and parallel, each being spaced from the others. The belts are operated continuously. The path taken by said belts includes a pair of spaced downwardly directed loops and synchronized, continuously operated transversely directed belts are located within each of said loops. The mounting is effected to enable vertical movement of the upper reaches thereof between positions above and below the plane occupied by the upper reaches of the conveyor.

A transverse series of fingers are arranged between the loops and the inlets of the pair of driers. This series of fingers are capable of being raised and lowered to prevent the further advance of the sheets on the conveyor toward the driers, and, then to release said sheets thereto. The movement of both the transverse belt mounting means and the fingers are synchronized to enable one sheet to be diverted and the second sheet to be stopped when it has reached a position parallel to the diverted sheet, then both sheets are released to travel side by side to the inlets of the pair of driers. Means also are provided on said transverse belt mounting means to cause the sheets to be engaged by the transverse belt when desired whereby transversely to shift said sheet. Stop means are provided to limit the transverse movement of said sheet.

Referring here to the Figures, the conveying apparatus constructed in accordance with the invention is designated generally by reference character 10 and is shown located between a silk-screen printing machine outlet 12 and a pair of drying machines, hereinafter referred to as driers 14 and 16. The machines 12, 14 and 16 are illustrated diagrammatically in the figures by their outlet and inlet representations respectively.

The conveyor 10 comprises a plurality of continuous belts 18 equipped with advancing movements in the direction of the arrow A, that is from the printing machine 12 to the driers 14 and 16, supported by rollers 20, 22 and 24, moved by roller 24. The roller 24 is integral with pulley 26 which is driven by belt 28 keyed on the pulley 30, itself driven by electric motor 32.

Figure 2:
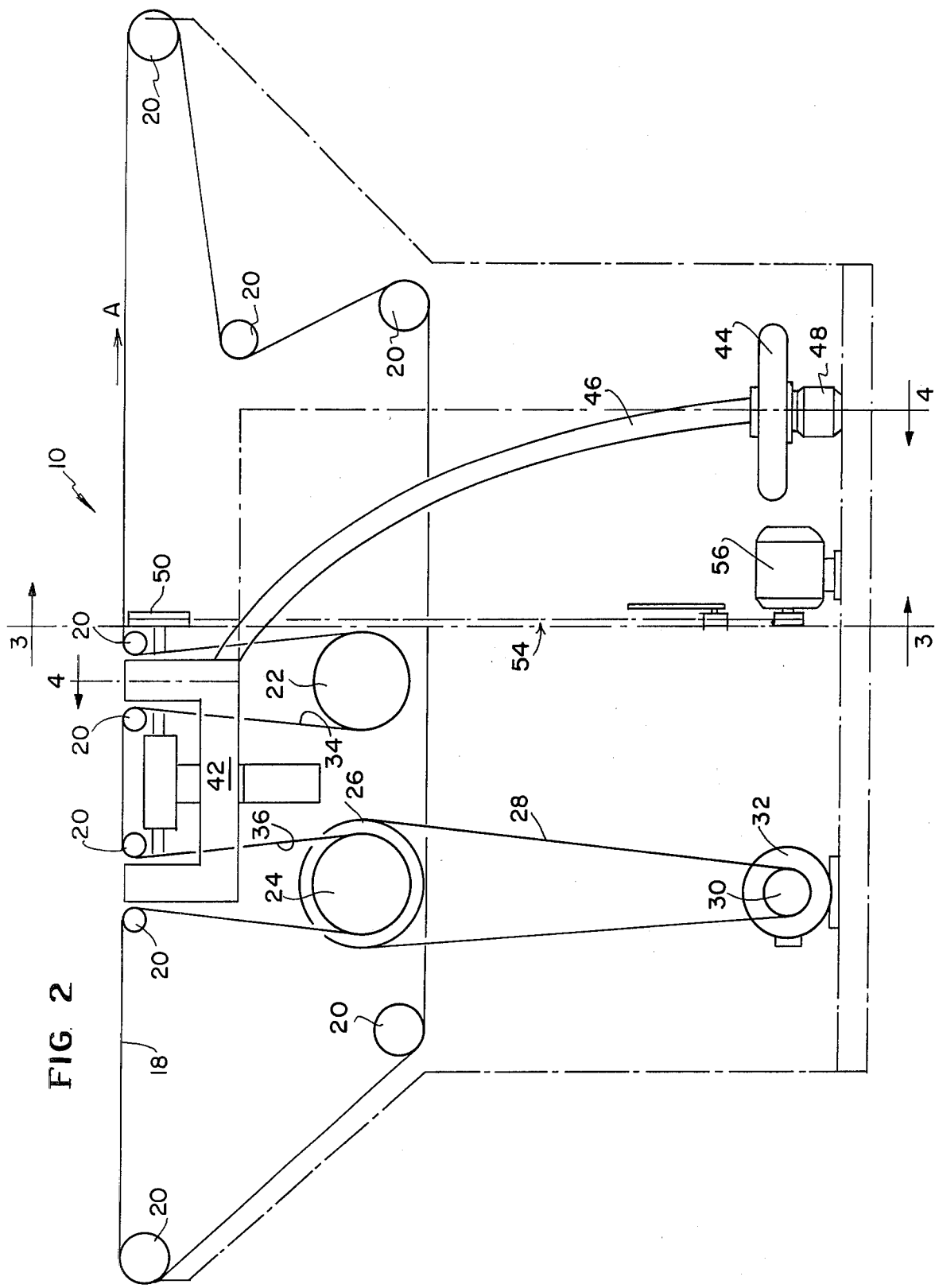
FIG. 2 is a transverse diagrammatic representation of the system constructed in accordance with the invention.
Figure 6:
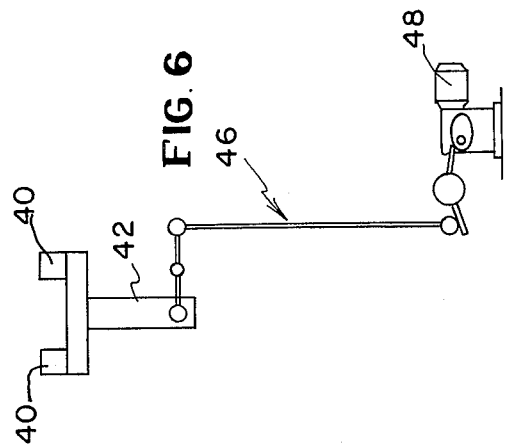
FIG. 6 is a diagrammatic representation of the transverse conveyor means of the invention, its drive means and linkages enabling the same to be raised and lowered.
Figure 3:
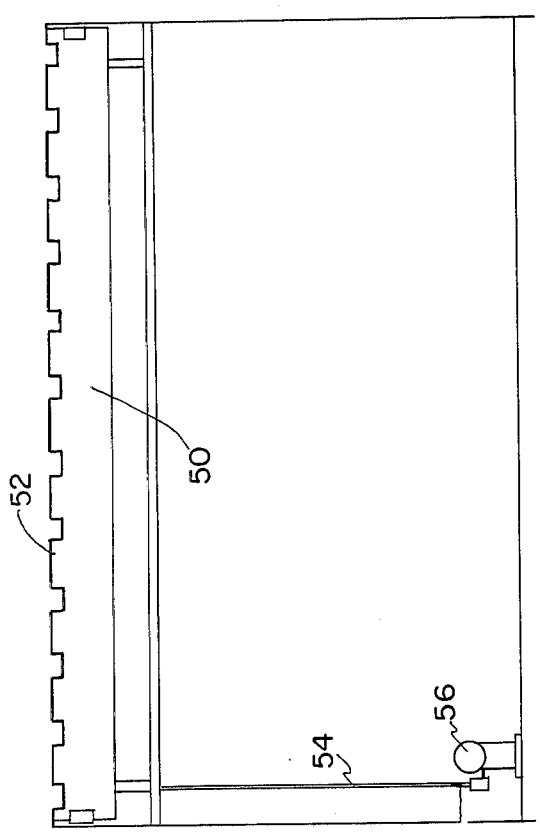
FIG. 3 is a diagrammatic sectional representation taken along lines 3—3 of FIG. 2 and in the direction indicated.
Figure 4:
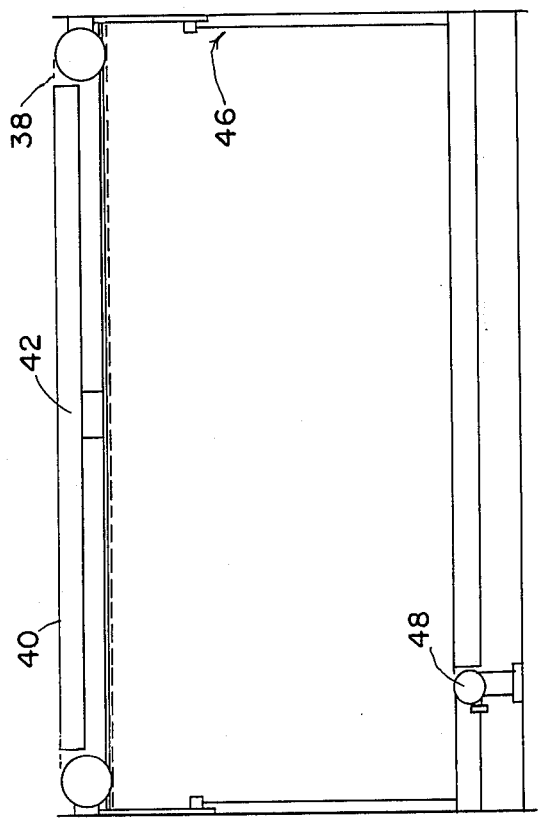
FIG. 4 is a diagrammatic sectional representation taken along lines 4—4 of FIG. 2 and in the direction indicated.

The continuous belts 18 are formed by rollers 22 and 24 into a pair of direct loops 34 and 36, as represented in FIG. 2. In each one of said loops 34 and 36, there is disposed a continuous conveyor belt 38 transverse the direction of travel of said belts 18. The belts 38 extend entirely across the width of the belts 18. The belts 38 have an upper reach disposed in the upper horizontal plane of the conveyor formed of belts 18. A plurality of perforated strips 40 are provided comprising the cover of an aspiration box 42, which may be called a suction box. The suction box 42 is coupled to an aspirator 44 by conduit 46. The transverse belts 38 are supported upon the box 42 and are capable of being raised and lowered with the box 42 by means of linkage means 46 illustrated in FIG. 6 and driven by an electric motor 48.

Figure 5:
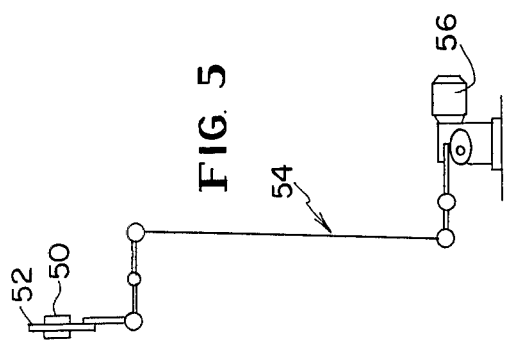
FIG. 5 is a diagrammatic representation of the drive means and linkages enabling the sheet intercepting means of the invention to be raised and lowered.

An elongate bar 50 is supported beneath the upper reaches of the belts 18 between the loop 36 and the driers 14 and 16. A plurality of fingers 52 are carried by said bar 50 along the length thereof, each finger extending, that is capable of extending between the spaces between belts 18. The bar 50 is coupled by linkage means 54 to an electric motor 56 and is capable of being raised and lowered, as represented in FIG. 5. Raising the bar 50 places the fingers 52 between the belts 18 so that they extend above the plane occupied by the upper reaches of said belts 18. In this way, fingers 52 intercept the path of travel taken by the sheets traveling on the upper reach of said belts 18.

Now the operation of the conveying apparatus 10 will be described. The longitudinal conveyor belt (comprising the plural belts 18) and the transversal pair of belts 38 are both in motion. When the first printed sheet, shown in phantom outline, is deposited from the printing machine 12 on the belts 18, the sheet travels along the upper reach thereof, to be stopped against the fingers 52. Means such as a photo-electric cell (not shown) senses the arrival of the sheet at that position, and, in a known manner, energizes the motor 48. The suction box 42 is raised, simultaneously raising the transverse belts 38 to make contact with the sheet. Suction is applied and the sheet is engaged by the belts 38. The sheet is displaced transversely from its position corresponding to the mouth of drier 16 to one corresponding to the mouth of the drier 14. A terminal transverse stop 58 is provided so as to limit the transverse movement of the sheet. A sensing device, such as another photoelectric cell (not shown) recognizes that the sheet which has been transversely displaced reaches the terminal stop 58, and causes the box 42 to be lowered, carrying with it, the transversal belts 38.

The next following sheet arrives from the printing machine 12 and is stopped in contact against the fingers 52 which are still raised. The sensing device, which may be a photo-electric cell (not shown) senses the arrival of said next sheet, and causes the fingers to be lowered by energizing the motor 56. The two sheets then proceed side by side toward the lateral driers 14 and 16. The fingers 52 are again lifted to their intercepting condition relative to the sheets traveling upon the upper reaches of belts 18.

In the embodiment described, reference has been made to the use of photoresponsive devices to "establish" or sense the determinate position of the advancing sheets, and to energize the motors etc. However, it is contemplated that many other sensing devices can be used in lieu of or in combination with such photosensitive devices, such as for example, micro-contacts and the like. It should also be pointed out that the particular application of this system is directed toward the silk screen printing art, the same can be advantageously applied to solve problems of sorting out or diverting (deviating) other objects traveling along the reach of a conveyor system to direct such objects in diverse directions.

What I claim is:

1. Apparatus for deviating the path of travel of sheet members traveling sequentially from a printing machine to a pair of side by side laterally arranged driers in a first direction along a conveyor reach traveling in the first direction and positioned between the printing machine and the driers; elongated means arranged transversely of said first direction for intercepting and stopping a first to arrive sheet member at a predetermined location along said first conveyor reach, a second conveyor reach generally coplanar with the first conveyor reach, said second conveyor reach traveling in a second direction transverse of said first direction and capable of being raised and lowered selectively to engage said first to arrive sheet member for displacing same from its stopped position to a transversely offset position along said first conveyor reach, said intercepting and stopping means being operable upon the next to arrive sheet member holding same against movement in the first direction while maintaining said displaced first to arrive sheet member against movement in said first direction and means for releasing said intercepting and stopping means to enable continued travel of said first to arrive and next to arrive sheet members side by side simultaneously in the first direction to the driers.

2. The apparatus as claimed in claim 1 in which said intercepting means comprises a series of projecting fingers arranged transversely of said first conveyor reach and means for moving said fingers into and out of intercepting relationship with said sheet members traveling in said first direction on said reach.

3. Apparatus for deviating the path of travel of objects traveling upon a conveyor reach traveling in a first direction, means arranged transversely of said first direction for intercepting said objects and checking the advance thereof at a predetermined locaalong said conveyor reach, means to engage said intercepted object and transport same transversely to said first direction to a location offset from said predetermined location, said transporting means comprising a pair of direct loops formed by said conveyor reach, at least one endless conveyor disposed in each of said loops and arranged transverse the direction of travel of said conveyor reach, suction box means having cover means equal in number to said transversely directed conveyors, each cover being perforated and means for mounting said transverse conveyors arranged to place the upper reaches thereof over said covers, a source of suction and conduit means coupling the suction box means to said source of suction and means for raising and lowering said suction box means and transverse conveyors above and below the plane occupied by said conveyor reach, means for raising and lowering said intercepting means synchronously with the operation of said raising and lowering means for said suction box means and transverse conveyors, means selectively to apply suction to objects carried by said transverse conveyors and means to displace said intercepting means from the intercepting condition upon a second object reaching said predetermined position, whereby to permit continued travel of both objects in the first direction.

4. Apparatus for deviating the path of travel of successive objects traveling upon a conveyor reach traveling in a first direction, means arranged transversely of said first direction for intercepting said objects and checking the advance thereof at a predetermined location along said conveyor reach, said intercepting means comprising a series of projecting fingers arranged transversely of said conveyor reach and means for moving said fingers into and out of intercepting relationship with the objects traveling in said first direction on said reach, means to engage said intercepted object and transport same transversely to said first direction to a location offset from said predetermined location, said transporting means comprising a pair of direct top opening loops defined by said conveyor reach and at least one transverse conveyor belt disposed within each loop and having an upper reach selectively moveable above and below the plane occupied by said conveyor reach traveling in the first direction and means to displace said intercepting means from the intercepting condition upon a second object reaching said predetermined position, whereby to permit continued travel of both objects in the first direction.

5. Apparatus for alternatingly conveying silk screen printed sheets along a conveyor arranged between a printing machine and at least a pair of laterally side by side arranged driers, said apparatus comprising means for stopping a first to arrive sheet originating from the printing machine in a predetermined position along the conveyor corresponding to the mouth of one drier, means for transversely displacing said first to arrive sheet to an offset but coplanar position on said conveyor corresponding to the mouth of the other drier, said stopping means being structurally positioned to allow transverse displacing of said first to arrive sheet, to maintain said first to arrive sheet in the offset coplanar position and to intercept and hold the next to arrive sheet at said predetermined position and means releasing both sheets simultaneously to enable them to travel side by side coplanar and parallel each to the respective one of the pair of driers.

6. The apparatus as claimed in claim 5 in which said stopping means comprises a series of projecting fingers arranged transversely of said conveyor and means for moving said fingers into and out of intercepting relationship with said sheets traveling in said first direction on said conveyor.

7. A method of alternatingly conveying printed silk screen printed sheets from a printing machine of lateral driers arranged side by side and along a conveyor arranged between said printing machine and said driers, said method comprising the steps of alternately stopping the first sheet originating from the printing machine in a position corresponding to the mouth of one drier, transversely displacing said first sheet to a position corresponding to the mouth of the other drier, stopping the next to arrive sheet at the mouth of the first drier and releasing both sheets to enable them to travel simultaneously each to the respective one of the pair of driers.

* * * * *